United States Patent [19]

Szumachowski et al.

[11] 4,160,066

[45] Jul. 3, 1979

[54] AGE-HARDENABLE WELD DEPOSIT

[75] Inventors: Edwin R. Szumachowski, Springettsbury Township, York County; Robert F. Miller, Dover Township, York County, both of Pa.

[73] Assignee: Teledyne Industries, Inc., Los Angeles, Calif.

[21] Appl. No.: 883,139

[22] Filed: Mar. 3, 1978

Related U.S. Application Data

[63] Continuation of Ser. No. 840,897, Oct. 11, 1977, abandoned.

[51] Int. Cl.$^2$ .............................................. B32B 15/18
[52] U.S. Cl. ................................... 428/683; 75/126 C; 75/126 H; 148/127; 219/146.1; 219/146.41; 228/263; 428/685; 428/939
[58] Field of Search ................. 75/122, 126 C, 126 H; 148/31, 127; 228/263; 219/146.1, 146.41; 428/682, 683, 685, 939

[56] References Cited

U.S. PATENT DOCUMENTS 2,848,323  8/1958  Harris et al. ........................ 75/126 H
3,508,912  4/1970  Chandhok et al. ................. 75/126 R

FOREIGN PATENT DOCUMENTS 39-16768  8/1964  Japan ..................................... 75/126 C
749993 of 1882  United Kingdom .................. 75/126 H

OTHER PUBLICATIONS

Stahlschlüssel, 10th Ed. 1974, p. 207, #64.

Primary Examiner—Arthur J. Steiner
Attorney, Agent, or Firm—Charles J. Long

[57] ABSTRACT

An age hardenable iron-base alloy weld deposit consisting essentially of, in weight percent,

| Carbon | 0.2 maximum |
| Manganese | 1.3 maximum |
| Silicon | 1.0 maximum |
| Phosphorus | 0.02 maximum |
| Sulfur | 0.02 maximum |
| Chromium | 3 to 10 |
| Molybdenum | 9 to 13.5 |
| Cobalt | 15 to 25 |
| Nickel | 0.3 maximum |
| Iron | Balance | wherein the ratio of (% chromium plus % molybdenum) to (% cobalt plus % nickel) is between about 0.75 and about 1.10.

6 Claims, No Drawings

AGE-HARDENABLE WELD DEPOSIT

CROSS-REFERENCE TO RELATED APPLICATION

This is a continuation of application Ser. No. 840,897, filed Oct. 11, 1977, now abandoned.

BACKGROUND OF THE INVENTION

1. Field of the Invention

This invention relates to age hardenable iron-base alloy weld deposits. More particularly the invention relates to such deposits which provide superior galling resistance and hot hardness up to at least 1450° F. (790° C.). Our weld deposits are preferably applied to ferrous alloy base materials such as low alloy, carbon, mild and tool steels.

2. Description of the Prior Art

Many industrial applications involve metal-to-metal wear at high temperatures; examples of such applications are hot extrusion dies and hot shearing blades which may reach temperatures as high as 1450° F. (790° C.) in service. Alloys used in such applications, either as the working parts or as surface layers on the working parts, should have good galling resistance and good hardness at working temperatures.

Heretofore, the most widely used alloys for applications such as those described above have been expensive nickel-base and cobalt-base alloys, the former typified by the wrought alloy INCONEL* 718 and the latter by commercial welding alloys classified by the American Welding Society (AWS) as ER CoCr-A and ER CoCr-C, which are applied as weld deposits on various base materials. More recently, alloys known as TRIBALOY 400 (cobalt base) and TRIBALOY 700 (nickel base) have been introduced; in the heat treated condition these alloys contain large volume percentages of Laves phase intermetalic constituents. The TRIBALOYS are generally applied as powders to a base structure and then fused by the heat of an electric arc, although in experimental work they have been deposited using shielded metal arc welding electrodes.

*Registered trademark of the International Nickel Co.
**Trademark of the E. I. DuPont deNemours Co.

The nickel and cobalt base alloys of the prior art, particularly the TRIBALOYS which contain high percentages of molybdenum, are characterized by extremely high cost, and therefore their use has been limited. Moreover, several of the nickel and cobalt base alloys of the prior art are prone to crack when applied as weld deposits, and this further limits their utility. Finally, the TRIBALOY type alloys require a rather long aging treatment in order to develop optimum properties, which adds to their cost.

Another alloy suggested for possible use in high temperature metal-to-metal wear applications is a chromium-and cobalt-containing tool steel disclosed in U.S. Pat. No. 3,508,912. However, this alloy is not balanced for use as a weld deposit; i.e. the patent disclosure does not teach weld metal composition necessary to obtain optimum hot hardness properties while avoiding excessive cracking. Consequently, the alloy disclosed in the patent, while useful to some extent as a wrought product, has serious disadvantages when applied as a weld deposit.

SUMMARY OF THE INVENTION

We have discovered that by maintaining the analysis of an iron base alloy weld deposit within limits to be described hereinbelow, an age hardening alloy deposit can be produced with superior galling resistance and hot hardness, as well as freedom from cracking, age hardenability to levels greater than 55 Rc, machinability in the as-deposited condition, dimensional stability, good fatigue resistance, and a significantly lower cost as compared to cobalt-and nickel-base alloys of the prior art. With these properties our deposit can be used in many applications where far more expensive nickel-base and cobalt-base materials have heretofore been required, and this can be done without loss of service performance. Moreover, our deposit has superior service life compared to standard hot worked tool steel alloys and to alloys such as those disclosed in U.S. Pat. No. 3,508,912.

We provide an age hardenable iron-base alloy weld consisting essentially of, in weight percent,

| | |
|---|---|
| Carbon | 0.2 maximum |
| Manganese | 1.3 maximum |
| Silicon | 1.0 maximum |
| Phosphorus | 0.02 maximum |
| Sulfur | 0.02 maximum |
| Chromium | 3 to 10 |
| Molybdenum | 9 to 13.5 |
| Cobalt | 15 to 25 |
| Iron | Balance | wherein the ratio of (% chromium plus % molybdenum) to % cobalt is between 0.75 and about 1.10.

Preferably our deposit consists essentially of, in weight percent,

| | |
|---|---|
| Carbon | Low as possible |
| Manganese | 0.1 to 0.8 |
| Silicon | 0.5 maximum |
| Phosphorus | Low as possible |
| Sulfur | Low as possible |
| Chromium | 4 to 6 |
| Molybdenum | 11 to 12.7 |
| Cobalt | 16 to 21 |
| Iron | Balance | and the ratio of (% chromium plus % molybdenum) to % cobalt is between 0.90 and 1.05.

Our deposit is particularly useful when applied to ferrous alloy base materials of the group consisting of low alloy, carbon, mild and tool steels.

To develop optimum properties, our deposit should be aged 6 hrs. at 1050° F.

When applied using the shielded metal arc welding process we prefer the deposit to contain about 0.04% carbon, about 0.5% manganese, about 0.3% silicon, about 5% chromium, about 11.9% molybdenum and about 18% carbon.

When our deposit is applied using a semi-automatic tubular electrode we prefer it to contain about 0.04% carbon, about 0.5% manganese, about 0.3% silicon, about 5% chromium, about 10% molybdenum and about 16% cobalt.

DETAILED DESCRIPTION OF THE INVENTION

Our weld deposit is preferably applied as an overlay on ferrous base materials such as low alloy, carbon, mild, and tool steels. It is not entirely suitable for use on nickel base alloys, stainless steel containing nickel in excess of 6% by weight, austenitic manganese steels, or high carbon cobalt-base alloys unless a sufficient number of layers are deposited to obtain an essentially non-diluted overlay; excessive dilution of our deposit with such base materials causes a loss of its desirable properties.

The above stated analytical limits and relationships for our weld deposit are necessary to obtain the desired properties, and are based on the following described considerations:

Carbon should be kept as low as possible to avoid both the formation of high carbon martensite and the combination of carbon with chromium and molybdenum, all of which tend to increase the hardness of our deposit in the as-deposited condition and thereby impair its machinability. In addition, when carbon is high enough to form carbides with chromium and molybdenum the scale resistance and age hardening characteristics of our weld deposit are adversely affected and the important relationship between cobalt, chromium and molybdenum, discussed hereinafter, is interfered with. Finally, low carbon helps to insure good fatigue resistance and dimensional stability of the deposit over a wide range of temperatures.

Although manganese improves the crack resistance of our deposit, amounts over about 1.3% by weight have an adverse effect on its hot hardness characteristics, particularly above 1250° F. In order to minimize such adverse effects we prefer levels of manganese no greater than about 0.8% by weight.

As is common with most iron-base alloys, the phosphorus and sulfur levels of our deposit should be kept as low as possible to avoid damaging effects on crack resistance. We have set a broad limit of 0.02% by weight maximum for each of these elements but prefer that the levels be well below 0.02%.

Chromium improves heat and scale resistance, but it is a ferritizer and as such tends to lower the crack resistance of our weld deposit; to balance the two effects we maintain a broad chromium range of 3 to 10% by weight and we prefer chromium in the range of 4 to 6% by weight.

Molybdenum makes our deposit age hardenable because it combines with iron at aging temperatures to form an intermetallic constituent which we believe to be of the formula $Fe_2Mo$; this constituent imparts galling resistance and hot hardness to the deposit at temperatures up to at least about 1450° F. However, high molybdenum levels adversely affect the crack resistance of our weld deposits, such that unacceptable cracking cannot be avoided when more than about 14% by weight is present. Consequently we maintain molybdenum levels broadly between 9 and 13.5% by weight and preferably between 11 and 12.7% by weight.

Cobalt is the principal austenitizer of our weld deposit. As such, it provides the necessary metallurgical balance during welding to result in the formation of a low carbon ferritic matrix when the deposit reaches room temperature; this matrix enhances the rapid formation of small amounts of the $Fe_2Mo$ intermetallic constituent during the optimum age hardening treatment of the deposit (6 hrs at 1050° F. [565° C.]). In addition, cobalt adds to the hot hardness properties, and to some extent to the scale resistance, of our deposit. Weld metal cracking problems are encountered at cobalt contents well above 25% by weight, but the upper limit of this alloying element is determined principally by cost factors; i.e. above about 25% the cost of cobalt tends to wipe out the economic advantage of our deposit over nickel base and cobalt base alloys of the prior art. We maintain cobalt levels broadly between 15 and 25% by weight and we prefer cobalt in the range of 16 to 21% by weight. It should be noted that U.S. Pat. No. 3,508,912 teaches that cobalt above 15% by weight is of no value and in fact has certain adverse effects in the wrought alloy disclosed therein, whereas we have found that in our weld deposit cobalt above 15% is necessary to allow the use of high molybdenum content for optimum crack resistance, aging and hot hardness properties.

We have found that nickel adversely affects the hot hardness properties of our deposit and in sufficient amounts interferes with the age hardening mechanism, apparently by retarding the formation of the iron-molybdenum intermetallic constituent. To avoid these negative influences we maintain nickel at residual levels, i.e. less than about 0.3% by weight, and for best results we keep nickel well below 0.3% by weight. Again it should be noted that in U.S. Pat. No. 3,508,912 nickel at levels of about 2% by weight is recommended to avoid heat checking in the wrought tool steel disclosed; as will be seen hereinbelow, nickel at similar levels in our deposit would cause unacceptable damage to the hot hardness properties.

Tungsten can be substituted for molybdenum on about a 2 to 1 basis, but the cost of tungsten is higher than that of molybdenum and use of tungsten even on a 2 to 1 basis is not accomplished by any improvement of properties over those obtained with molybdenum. We therefore do not use tungsten.

Certain elements such as vanadium, columbium, titanium and zirconium are occasionally used in small amounts of tubular welding electrodes. We have found that these elements promote cracking in our weld deposit, so they should only be used under strict control in residual amounts; preferably we do not intentionally add any of these elements.

Aluminum promotes weld cracking and retards age hardening; therefore, although small amounts of aluminum are sometimes used in welding alloys, we do not use any aluminum in the deposit of our invention.

As is discussed more fully hereinbelow, the ratio (% Cr + % Mo)/(% Co + % Ni) determines whether or not our weld deposit will be satisfactorily crack-free. Our data indicate that ratios between about 0.90 and 1.05 eliminate fissuring entirely and that by maintaining the ratio between about 0.75 and about 1.10 the number and size of weld metal cracks formed will be small enough that commercial utility of the deposit is not impaired. Since the deposit of our invention is restricted to residual nickel levels, we ignore the nickel term in the ratio.

Other details, objects and advantages of our invention will become apparent as the following description of certain present preferred embodiments thereof proceeds.

To evaluate the properites of our weld deposit and compare various embodiments thereof with other alloys used for similar service applications by the prior art, weld deposits were made of the alloys studied, except for two prior art alloys, noted hereinbelow, which were tested in wrought form. Each weld deposit was prepared using covered electrodes in which the core wire composition and alloy additions made through the covering, if any, were balanced to give the desired final weld deposit composition; such balancing is well known and commonly done in the welding art. The electrodes included a titania (TiO$_2$) slag system typical of those known in the welding art as AC-DC.

Except as noted hereinafter, test specimens were prepared by depositing four layers of weld metal on a suitable base plate, commonly mild steel; with four layer deposits, however, the precise composition of the base plate is not critical, since the weld metal of the top layer, which has the actual metal tested, is essentially undiluted — i.e., the composition of the alloy in the fourth layer is derived solely from the covered element used.

In the data presented hereinbelow, certain chemical analysis figures are shown as estimated values; such estimates are based either on typical values obtained from prior analyses, applicable industry specifications, or published literature, or on calculations made using the overall electrode composition (and base plate composition in one case) and standard gains or losses in elements established from prior experience. Such estimations, commonly used by those skilled in the welding art, provide good representative analyses of weld deposits in cases where actual analysis is not critical.

EXAMPLE 1

Listed in Table 1 are the chemical analyses of a group of alloy weld deposits whose age hardening and hot hardness properties were studied. Deposits No. 1 through 6 are deposits of our invention. The 0.1% by weight estimated nickel represents a residual level, since no deliberate addition of nickel was made to any of Deposits 1 through 6. Deposit 7 of the invention to which increased manganese was added. Deposit 8 was a 2-layer deposit on a base plate of INCONEL 718 (typically 52 Ni — 19 Cr — 3 Mo — 5 Cb — 1 Ti — Bal. iron). The analysis of Deposit 8 was calculated based on a typical dilution factor of 33.3% per layer — i.e. the tested deposit was a mixture of approximately 8/9 metal from the welding electrode and 1/9 metal from the base plate. Deposits 9 and 10 had alloy balances within the teachings of U.S. Pat. No. 3,508,912.

Table 2 shows the age hardening properties of six of the deposits of Table 1 after aging for 6 hours at 1050° F. It will be noted that the deposits of the invention, Deposits 1, 2 and 5, as well as the alloys of U.S. Pat. No. 3,508,912, Deposits 9 and 10, show good properties. Although the level of nickel present in Deposit 9, which is within the nickel range recommended by U.S. Pat. No. 3,508,912, does not appear to have damaging effects on age hardening in that alloy, the results with Deposit 8, which contained an estimated 5.8% nickel, show clearly that even relatively modest amounts of nickel in our alloys can have a damaging effect on both as welded hardness and age hardening characteristics.

TABLE 2

| Deposit No. | Rockwell Hardness, Rc unless otherwise indicated | |
|---|---|---|
| | As Deposited | Aged 6 hrs at 1050F |
| 1 | 44 | 66 |
| 2 | 45 | 62 |
| 5 | 36 | 60 |
| 8 | 86 Rb | 89 Rb |
| 9 | 43 | 62 |
| 10 | 35 | 60 |

In Table 3 the hot hardness of the alloy weld deposits of Table 1 is shown; all deposits were aged 6 hrs at 1050° F. prior to hot hardness testing. Deposits of our invention, Nos. 1 through 6, retain good hot hardness even at 1450° F. Addition of manganese, as in Deposit 7, results in damage to the hot hardness properties, particularly at the intermediate temperature of 1250° F. Deposit 10, the low nickel version of the alloy disclosed in U.S. Pat. No. 3,508,912, has reasonable hot hardness values, although it is considerably lower in hardness at 1050° F. and 1250° F. than deposits of the invention. The adverse effect of nickel on hot hardness is clearly seen in Deposits 9, meeting U.S. Pat. No. 3,508,912 and containing 2.8% nickel, and 8, substantially equivalent to our inventive deposit except for containing approximately 5.8% nickel. It will be noted that increases in nickel content had significant adverse effects on hot hardness, especially at 1450° F.; at higher nickel levels hot hardness of our deposit deteriorates at all temperatures.

EXAMPLE 2

The hot hardness properties of preferred deposits of our invention were compared with those of five commercially available cobalt and nickel-base alloys reputed to be outstanding for hot hardness up to 1450° F. Table 4 presents the chemical analyses of the alloys involved and the hot hardness test results. Deposits 11 and 12 are representative of cobalt-base weld surfacing alloy deposits classified by the American Welding Society (AWS) as ECoCr-A and ECoCr-C respectively; these deposits were tested in the as-welded condition, the condition in which they are normally used. Deposits 13 and 14 were experimental weld deposits formulated to provide compositions corresponding to TRIBALOYS 400 and 700 respectively; these deposits were aged for 24 hours at 1350° F. to develop maximum properties before testing.

TABLE 1

| Deposit No. | Chemical Analysis, Percent by Weight | | | | | | | |
|---|---|---|---|---|---|---|---|---|
| | C | Mn | Si | Cr | Mo | Co | Ni | Other |
| 1 | 0.03 | 0.3 | 0.3 | 5.0 | 12.6 | 19.4 | 0.1* | Fe — Balance** |
| 2 | 0.04* | 0.3* | 0.3* | 4.9 | 11.4 | 18.4 | 0.1* | Fe — Balance** |
| 3 | 0.03 | 0.2 | 0.3 | 5.3 | 12.6 | 19.1 | 0.1* | Fe — Balance** |
| 4 | 0.03* | 0.5 | 0.3* | 5.3 | 12.7 | 19.1 | 0.1* | Fe — Balance** |
| 5 | 0.04* | 0.3* | 0.3* | 4.5 | 10.2 | 16.1 | 0.1* | Fe — Balance** |
| 6 | 0.03* | 1.2 | 0.3* | 5.8 | 12.5 | 19.7 | 0.1* | Fe — Balance** |
| 7 | 0.03* | 2.1 | 0.3* | 6.1 | 12.8 | 19.7 | 0.1* | Fe — Balance** |
| 8 | 0.04* | 0.3* | 0.3* | 6.5* | 11.5* | 17.3* | 5.8* | Fe — Balance** |
| 9 | 0.03 | 0.2 | 0.3 | 4.6 | 11.1 | 13.2 | 2.8 | N — 0.01 Fe—Balance** |
| 10 | 0.05 | 0.3 | 0.2 | 4.7 | 11.3 | 13.3 | 0.1 | N — 0.01 Fe—Balance** |

*Estimate
**Except for unavoidable impurities

TABLE 3

| | Hot Hardness at Indicated Temperature, Rc Unless Otherwise Indicated | | |
|---|---|---|---|
| | 1050F | 1250F | 1450F |
| 1 | 52 | 52 | 35 |
| 2 | 56 | 59 | 34 |
| 3 | O.S.* | 52 | 46 |
| 4 | 55 | 44 | 31 |
| 5 | O.S.* | 54 | 24 |
| 6 | O.S.* | 51 | 24 |
| 7 | O.S.* | 39 | 21 |
| 8 | T.S.** | T.S.** | T.S.** |
| 9 | 55 | 44 | 92 Rb |
| 10 | 41 | 40 | 26 |

*Off scale (too hard).
**Too soft to get reading.

TABLE 4

| Deposit No. | Heat Treatment | Chemical Analysis, Percent By Weight | | | | | | | | Rc Hardness at Indicated Temperatures | | |
|---|---|---|---|---|---|---|---|---|---|---|---|---|
| | | C | Mn | Si | Cr | Mo | Co | Ni | Others | 1050 | 1250 | 1450 |
| 1 | A | 0.03 | 0.3 | 0.3 | 5.0 | 12.6 | 19.4 | 0.1* | Fe-Balance** | 52 | 52 | 35 |
| 3 | A | 0.03 | 0.2 | 0.3 | 5.3 | 12.5 | 19.1 | 0.1* | Fe-Balance** | Off Scale-too hard | 52 | 46 |
| 11 | AW | 0.7* | | 2 max | 27.0* | W/4.5* | 62* | | Fe-Balance** | 39 | 34 | 30 |
| 12 | AW | 2.0* | | 2 max | 29.0* | W/12.0* | 51 | | Fe-Balance** | 28 | 31 | 32 |
| 13 | B | 0.03* | 0.1* | 3.6 | 9.7 | 29.5* | Bal** | | | 48 | 47 | 48 |
| 14 | B | 0.04* | 0.2* | 2.7 | 14.6 | 32.4* | | Balance** | | 41 | 37 | 38 |
| 15 | HT | 0.04* | 0.2* | 0.2* | 18.6* | 3.1* | | 52.5* Balance** | 5.0Cb,0.9Ti, 0.4Al,18.5Fe* | 36 | 32 | 23 |

*Estimates
**Except for unavoidable impurities
AW As Deposited
A 6 hr 1050
B 24 hr 1350

Finally, "Deposit" 15 was a sample of wrought IN-CONEL 718 which had been treated as recommended by the manufacturer to develop optimum properties. It will be apreciated that all of Deposits 11 through 15 are considerably more expensive than the deposits of our invention.

As will be seen from Table 4, weld deposits of our invention are generally equivalent or superior to the commercial alloys against which they are compared in hot hardness properties. Only the TRIBALOYS, Deposits 13 and 14, exceeded the deposits of our invention in hardness, and this only by a slight margin at 1450° F.

heretofore used in similar applications, and at significantly less cost.

EXAMPLE 3

Weld deposits of our invention are characterized by superior crack resistance. In Table 5 the crack resistance of deposits of our invention is compared with that of six of the prior art deposits discussed in the foregoing examples. To compare crack resistance a two-phase crack test was devised.

In the first phase of the test each deposit was applied to ½-inch thick mild steel base plate in a series of single weld beads up to 4 layers high. Each layer was examined for evidence of cracking and a crack resistance rating (CRR) was assigned equal to the layer in which cracking was found, if any; i.e., a deposit cracking in the first layer was given a CRR of 1, while one cracking in the fourth layer was assigned a CRR of 4. If a deposit did not crack during the first phase, it was then subjected to the second phase of the crack test. Since the first phase consisted only of single bead layers on ¼-inch thick plate, which did not subject the deposit to high restraint, and since cracking tendency was further reduced for the deposits tested by using preheat and interpass temperatures of 400° F. or 600° F., the latter tending to be more beneficial in this regard, the first phase was not considered to be very severe from a weld metal cracking viewpoint.

TABLE 5

| Deposit No. | Composition | Preheat and Interpass Temperarure | Crack Resistance Rating (CRR) | Results of Fluorscent Penetrant Examination | Comments |
|---|---|---|---|---|---|
| 1 | Invention | 400F | 17 | Clean | Excellent crack resistance |
| 3 | Invention | 400F | 17 | Clean | Excellent crack resistance |
| 9 | U.S. Pat. No. 3,508,912 (high Nickel) | 400F | 17 | Clean | Excellent crack resistance |
| 10 | U.S. Pat. No. 3,508,912 (low Nickel) | 400F | 17 | 18 transverse fissures, ¼ inch to 1 inch long | Unacceptable crack resistance |
| 11 | AWS ECoCr-A | 600F | 17 | 1 fissure | Excellent crack resistance |
| 12 | AWS ECoCr-C | 600F | 7 | Did not run | Third bead of RCT cracked badly; poor crack resistance |
| 13 | TRIBALOY 400 | 600F | 1 | Did not run | Cracked first bead of first phase; very poor crack resistance |
| 14 | TRIBALOY 700 | 600F | 6 | Did not run | Second bead of RCT cracked; very poor crack resistance |

In general, it can be concluded from these tests that the deposits of our invention have hot hardnesses which are equivalent or superior to those of commercial alloys Consequently, deposits which cracked during the first phase were deemed to have very poor crack resistance. However, the first phase did provide a means of evaluating relative crack resistance between the highly crack sensitive materials of the group tested.

The second phase of the crack resistance test involved a restrained crack test (RCT), a much more severe test of the deposits studied. In the RCT, 1¼ inch by 2½ inch by 12 inch mild steel base plate was used; because of its thickness and the fact that it was heavily clamped, this plate offered fairly severe rigidity and thus caused much higher stresses in the weld metal than the plate used in the first phase; some of the severity of the test was counteracted by the fact that preheat and interpass practice was used as in the first phase, but the RCT still remained a much more severe test than the first phase. With each deposit tested, 8½ inch long weld beads were deposited in layers 4 beads wide, up to a maximum of 3 layers (12 beads total); at the completion of each bead the deposit was inspected visually for cracks. Generally any cracks observed visually were rather large, transverse to the weld bead and about ½-inch or more long, and their appearance indicated that further welding would produce even more cracking. Consequently, weld deposition was stopped whenever cracking was visually observed in a bead. If no cracks were found visually throughout the entire 12 beads, the final RCT weld surface was ground and checked for crack by fluorescent penetrant methods; results of such checking revealed that although extremely small cracks, or fissures, were often missed in visual inspection, large cracks were found in all but one instance, noted below.

After testing, each deposit was given an overall crack resistance rating (CRR) based on the bead in which visually observable cracking occurred. If cracking occurred in the second RCT bead, for example, a CRR of 6 was assigned; this included a rating of 4 for successfully passing the first phase plus 2 for the two beads deposited before cracking in the RCT. If a deposit cracked in the 12th bead, the last possible bead of the RCT, it was given a rating of 16 (4+12). For successful completion of the entire RCT (no visual cracks), a deposit was assigned a CRR of 17.

As is evident from Table 5, the deposits of our invention were equal to or better than the other deposits tested in crack resistance. It should be noted that a deposit having a CRR of 6 or less was considered to be too crack sensitive for general commercial use; Deposit 11, one of the two which compared favorably with deposits of our invention, is known to be expensive and difficult to weld and therefore its commercial use is limited. Deposit 10 did not appear to have cracked during RCT welding, but a substantial number of large cracks were observed after fluorescent penetrant checking. Such large cracks would normally prevent completion of the RCT; why they did not in this case was not known. In any event, the ½ to 1-inch long cracks found in Deposit 10 indicated that such deposit must be rated as crack sensitive and thus of limited use as a commercial welding alloy. It is believed that the cracking observed in Deposit 10 occurred because the total austenitizing alloy elements, principally cobalt, were too low, as will be discussed further hereinbelow.

EXAMPLE 4

We have found that even among those alloy weld deposits of the general type of our invention which have crack resistance ratings (CRR's) of 17 in the test of Example 3, some may be undesirable for commercial use because of fissures that are evident only upon fluorescent penetrant examination after the Example 3 test specimen is completed. In such deposits, optimum crack resistance is achieved by suitably controlling the relationship between the major ferritizers chromium and molybdenum and the major austenitizers cobalt and nickel; specifically, we have found that the value of the ratio (% Cr + % Mo)/(% Co + % Ni) appears to determine whether or not weld deposits of the invention will be acceptably free of fissures.

Table 6 lists chemical data and fluorescent penetrant check results for twelve alloy weld deposits having CRR's of 17 in the test of Example 3; the deposits include several of our invention and two alloys disclosed in U.S. Pat. No. 3,508,912. The data are arranged in order of increasing values of the ratio (% Cr + % Mo)/(% Co + % Ni), and they show that a ratio of from about 0.90 to about 1.05 appears to eliminate cracking entirely, and ratios between about 0.75 and about 1.10 restrict the formation of fissures of 15 or less, which we consider satisfactory for commercial use. Note that the ratio of Deposit 10, discussed in Example 3, was 1.20, and the fluorescent penetrant check showed this deposit to be unacceptable for commercial use.

Additional study of the ratio (% Cr + % Mo)/(% Co + % Ni) and its effect on crack resistance in deposits related to our invention indicated that the ratio is apparently effective only when molybdenum is below 14.0% by weight; we believe that at higher molybdenum levels metallurgical changes occur that invalidate the relationship.

EXAMPLE 5

In order to test and rate relative galling resistance of deposits of our invention and prior art alloys used for galling resistance, a galling test was employed. In the test, a coupling was produced by contacting the surface of a metal button against that of a stationary metal block under a controlled stress; the button was then hand rotated slowly through one revolution, after which the mating surfaces were examined for galling at a magnification of 10×. The presence of metal build-up on the surface of either the button or the block indicated that galling had occurred. If galling was not found after the first test, new button and block area combinations were tested as successively higher loads until galling was found; when galling was discovered, it was confirmed by testing one more combination at a still higher load.

TABLE 6

| Deposit No.[1] | Analysis, Percent by Weight | | | | | | Cr + Mo/ Co + Ni | Fluorescent Penetrant Check[2] |
|---|---|---|---|---|---|---|---|---|
| | Cr | Mo | Cr + Mo | Co | Ni | Co + Ni | | |
| 16 | 3.03 | 11.89 | 14.92 | 23.52 | (.1)[3] | 23.62 | 0.63 | 80 TC |
| 17 | 6.51 | 10.62 | 17.13 | 22.64 | (.1) | 23.74 | 0.75 | 1 CC |
| 18 | 3.03 | 11.38 | 14.41 | 18.1 | (.1) | 18.51 | 0.78 | 3 TC; 2 CC |
| 19 | 9.89 | 4.37 | 14.26 | 17.53 | (.1) | 17.63 | 0.81 | 1 CC |
| 20 | 6.91 | 10.66 | 17.57 | 21.11 | (.1) | 21.21 | 0.83 | 3 TC, 3 CC |
| 1 | 4.95 | 12.57 | 17.52 | 19.43 | (.1) | 19.53 | 0.90 | 0 |
| 9 | 4.64 | 11.11 | 15.75 | 13.20 | 2.77 | 15.97 | 0.99 | 0 |

TABLE 6-continued

| Deposit No.[1] | Analysis, Percent by Weight | | | | | | Cr + Mo/ Co + Ni | Fluorescent Penetrant Check[2] |
|---|---|---|---|---|---|---|---|---|
| | Cr | Mo | Cr + Mo | Co | Ni | Co + Ni | | |
| 21 | 7.61 | 11.63 | 19.24 | 18.54 | (.1) | 18.64 | 1.04 | 0 |
| 22 | 2.93 | 11.65 | 14.58 | 13.69 | (.1) | 13.79 | 1.06 | 4 TC; 3 LC; 7 CC |
| 10 | 4.71 | 11.32 | 16.03 | 13.27 | .13 | 13.40 | 1.20 | 18 TC, ¼" to 1" long |
| 23 | 2.89 | 11.96 | 14.85 | 11.26 | (.1) | 11.36 | 1.31 | 19 TC; 4 LC |
| 24 | 7.49 | 11.62 | 19.11 | 13.34 | (.1) | 13.44 | 1.42 | 100 TC |

[1]All had CRR's of 17.
[2]TC — Transverse fissures  LC — Longitudinal fissures  CC — Crater crack
[3]Estimates are in parentheses Because light loads did not cause full area contact in this test, the actual contact area between button and block was measured at 10× magnification to convert the applied load to galling stress. The greater the stress to produce galling, the better the galling resistance.

Table 7 lists the results of five galling tests. In each test wrought type 316 stainless steel was used as the rotated button because the alloy is widely used in applications where high temperature strength and galling resistance are important. As a standard for comparison wrought type 316 was also used as the stationary block for Test A. The other four tests utilized four different weld deposits for the stationary blocks; Test D utilized the deposit of our invention, while Tests B, C and E utilized commercial weld deposits generally considered to have good high temperature strength. Except for Test B, the tested weld deposits were essentially undiluted; the cobalt base deposit of Test B was slightly diluted, since it was only two layers high on type 304 stainless steel base plate, but the fact that it was a cobalt-base alloy appeared to make it tolerant of some dilution, as evidenced by the excellent test results obtained. Note from Table 7 that in galling resistance the deposit of our invention is far superior to type 316 and to HASTELLOY* C (15 Cr — 16 Mo — 4 W — Bal. Nickel), and is competitive with AWS ECoCr-A and TRIBALOY 700.

*Registered Trademark of Union Carbide Corporation

In summary, weld deposits of our invention provide improved properties over prior art alloys used in similar applications and are considerably less expensive to produce than most such alloys.

While we have described certain present preferred embodiments of the invention, it is to be distinctly understood that the invention is not limited thereto but may be otherwise variously embodied within the scope of the following claims.

TABLE 7

Galling Test Results

| Test No. | Button | Block | Weld Deposit Layers | Maximum Stress to Gall, Ksi[1] |
|---|---|---|---|---|
| A | 316 | 316 | — | 4.0 |
| B | 316 | AWS ECoCr-A (Deposit No. 12) | 2 | 45.0 |
| C | 316 | HASTELLOY C | 8 | 2.0 |
| D | 316 | Invention (Deposit No. 1) | 6 | 38.0[2] |
| E | 316 | TRIBALOY 700 (Deposit No. 14) | 4 | 35.0[2] |

[1]Values above 30 ksi are regarded to have excellent galling resistance.
[2]Test stopped before galling occurred.

We claim:

1. An age hardenable iron-base alloy weld deposit consisting essentially of, in weight percent,

| Carbon | 0.2 maximum |
|---|---|
| Manganese | 1.3 maximum |
| Silicon | 1.0 maximum |
| Phosphorus | 0.02 maximum |
| Sulfur | 0.02 maximum |
| Chromium | 3 to 10 |
| Molybdenum | 9 to 13.5 |
| Cobalt | 15 to 25 |
| Nickel | 0.3 maximum |
| Iron | Balance | wherein the ratio of (% chromium plus % molybdenum) of (% cobalt plus % nickel) is between about 0.75 and about 1.10

2. A deposit as claimed in claim 1 which contains, in weight percent,

| Carbon | about 0.04 |
|---|---|
| Manganese | about 0.5 |
| Silicon | about 0.3 |
| Chromium | about 5 |
| Molybdenum | about 10 |
| Cobalt | about 16 |

3. A weld deposit as claimed in claim 1 which has been aged 6 hours at 1050° F.

4. A weld deposit as claimed in claim 1 which contains of, in weight percent,

| Carbon | Low as possible |
|---|---|
| Manganese | 0.1 to 0.8 |
| Silicon | 0.5 maximum |
| Phosphorus | Low as possible |
| Sulfur | Low as possible |
| Chromium | 4 to 6 |
| Molybdenum | 11 to 12.7 |
| Cobalt | 16 to 21 | wherein the ratio of (% chromium plus % molybdenum) to (% cobalt plus % nickel) is between 0.90 and 1.05.

5. A weld deposit as claimed in claim 4 which contains, in weight percent,

| Carbon | about 0.04 |
|---|---|
| Manganese | about 0.5 |
| Silicon | about 0.3 |
| Chromium | about 5 |
| Molybdenum | about 11.9 |
| Cobalt | about 18 |

6. A composite article comprising a base material having a weld deposit thereon, the base material selected from the group consisting of low alloy, carbon, mild and tool steel, the weld deposit consisting essentially of, in weight percent,

| | |
|---|---|
| Carbon | 0.2 maximum |
| Manganese | 0.1 to 0.8 |
| Silicon | 0.5 maximum |
| Phosphorus | 0.02 maximum |

-continued

| | |
|---|---|
| Sulfur | 0.02 maximum |
| Chromium | 4 to 6 |
| Molybdenum | 11 to 12.7 |
| Cobalt | 16 to 21 |
| Nickel | 0.3 maximum |
| Iron | Balance | and having a ratio of (% chromium plus % molybdenum) to (% cobalt plus % nickel) between about 0.90 and about 1.05.

* * * * *

UNITED STATES PATENT AND TRADEMARK OFFICE
CERTIFICATE OF CORRECTION

PATENT NO. : 4,160,066
DATED : July 3, 1979
INVENTOR(S) : Edwin R. Szumachowski and Robert F. Miller It is certified that error appears in the above-identified patent and that said Letters Patent are hereby corrected as shown below:

Column 2, line 16; insert -- deposit -- after "weld"

Column 2, line 55; delete "carbon" and substitute -- cobalt -- therefor.

Column 4, line 34; delete "of" and substitute -- in -- therefor.

Column 5, line 8; delete "has" and substitute -- was -- therefor.

Column 5, line 10; delete "element" and substitute -- electrode -- therefor.

Column 7, line 34 should not be a new paragraph.

Column 9, line 26; delete "crack" and substitute -- cracks -- therefor.

Column 10, line 55; delete "as" and substitute -- at -- therefor.

Table 6, Deposit No. 18; under "Co", delete "18.1" and substitute -- 18.41 -- therefor.

Column 11, line 24; delete "the" and substitute -- that -- therefor.

Column 12, line 31; delete "of" and substitute -- to -- therefor.

Column 12, line 46; delete "of".

Column 13, line 5; delete "steel" and substitute -- steels -- therefor.

Signed and Sealed this

Ninth Day of October 1979

[SEAL]

Attest:

RUTH C. MASON
Attesting Officer

LUTRELLE F. PARKER
Acting Commissioner of Patents and Trademarks